United States Patent
Imataki

Patent Number: 5,216,665
Date of Patent: Jun. 1, 1993

[54] INFORMATION RECORDING MEDIUM
[75] Inventor: Hiroyuki Imataki, Kawasaki, Japan
[73] Assignee: Canon Kabushiki Kaisha, Tokyo, Japan
[21] Appl. No.: 458,365
[22] Filed: Dec. 28, 1989
[30] Foreign Application Priority Data
Dec. 28, 1988 [JP] Japan .................. 63-332629
[51] Int. Cl.[5] ............................................. G11B 7/26
[52] U.S. Cl. .................... 369/279; 369/275.4; 369/284
[58] Field of Search .............. 369/284, 270, 272, 271, 369/277, 279, 278, 275

[56] References Cited
U.S. PATENT DOCUMENTS

| | | | |
|---|---|---|---|
| 3,968,326 | 7/1976 | Nosker et al. | 369/279 X |
| 4,209,804 | 6/1980 | Dil | 369/275.4 X |
| 4,230,915 | 10/1980 | Dil et al. | 369/275.4 X |
| 4,325,135 | 4/1982 | Dil et al. | 369/275.3 X |
| 4,711,798 | 12/1987 | Ueda et al. | 369/284 X |
| 4,868,808 | 9/1989 | Tinet | 369/275.1 |
| 4,925,733 | 5/1990 | Imataki et al. | 428/336 |
| 4,956,214 | 9/1990 | Imataki et al. | 428/64 |
| 4,972,402 | 11/1990 | Miura et al. | 369/275.1 |

FOREIGN PATENT DOCUMENTS
0186227 7/1986 European Pat. Off. ............ 369/284
239947 11/1985 Japan.

Primary Examiner—Eugene R. LaRoche
Assistant Examiner—Michael C. Kessell
Attorney, Agent, or Firm—Fitzpatrick, Cella, Harper & Scinto

[57] ABSTRACT

An optical recording medium is formed by applying a coating liquid to form a light-reflecting layer on a substrate having a surface provided with a pre-format pattern comprising a concavity and a convexity. The concavity is designed to have a sectional shape of a trapezoid having a pair of parallel opposite sides, a shorter one of which constitutes the bottom of the concavity, and a pair of sloping sides. Each sloping side forms a (solid part) angle $\theta$ of not larger than 35 degrees with respect to the extension of the substrate surface. The concavity has a depth d larger than $\lambda/4n$ wherein $\lambda$ is the wavelength of an optical radiation beam with which the optical recording medium is illuminated for recording and/or reproduction and n is the refractive index of the substrate.

36 Claims, 5 Drawing Sheets

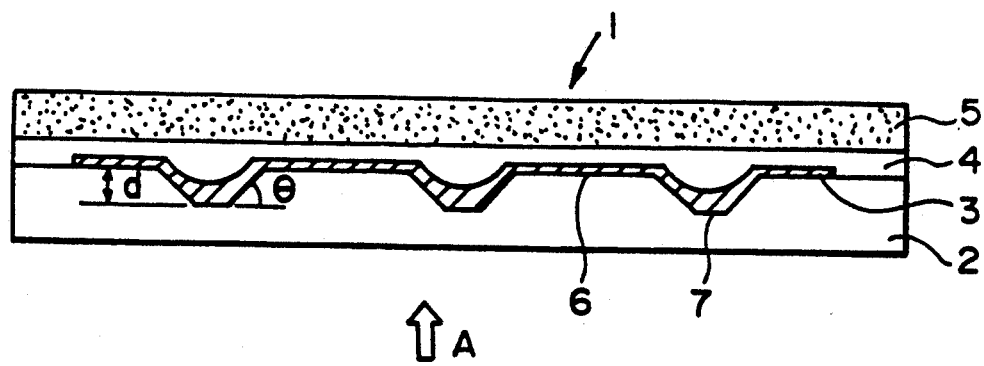
F I G. 1
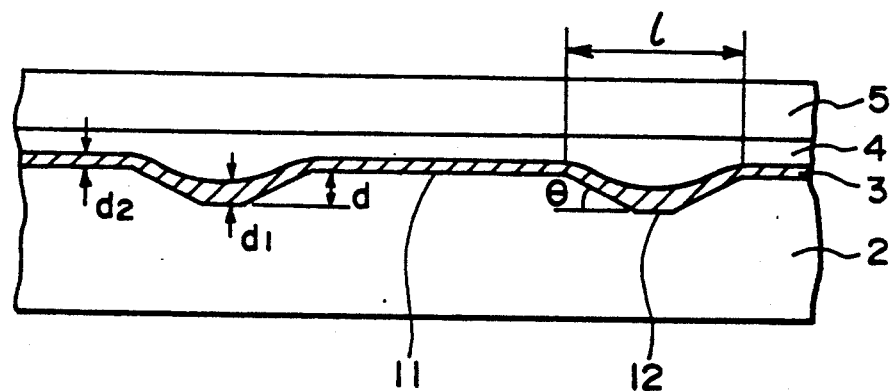
F I G. 2

INFORMATION RECORDING MEDIUM

FIELD OF THE INVENTION AND RELATED ART

The present invention relates to an information recording medium for optically recording and/or reproducing information or data by utilizing light or radiation, particularly an information recording medium capable of providing a good pre-format signal.

In recent years, commercialization and extensive research and development have been performed on optical information recording and reproduction apparatus inclusive of an electronic file system using compact disks or additionally writable disks, an optical disk system using an opto-magnetic material or phase transition-type material allowing erasure, etc. Further, recently, attention has also been called to a system using a personal optical recording medium, such as an optical recording medium in the form of a card (hereinafter referred to as an "optical card"). An optical card is characterized in that it is easily carried because of its shape and has a large information capacity relative to its area compared with a disk in which the central portion is not usable for information recording.

Such optical recording media include those of exclusive reproduction-type such as audio compact disk ("CD"), video disk and CD-ROM used for mass circulation of information; those of additional writing-type capable of additionally writing information used for, e.g., information filing; and further those of a rewritable-type. Such optical recording media are required to show a high recording density in respect of quantity and is capable of reproducing recorded information without an error, thus showing a high C/N ratio in respect of quality.

In the exclusive reproduction-type, the quality of reproduced information is affected by the structure of information recorded on the substrate. For example, in case of recording medium of the amplitude-type wherein information is recorded by a difference in optical density and reproduced by an amplitude difference thereof, the detected signal is affected by the density difference and the magnitude thereof. In case of recording medium of the phase-type wherein information is recorded by an unevenness and reproduced by a phase difference caused thereby, the detected signal is affected by a three-dimensional shape of the unevenness.

In case of the additional writing-type, formatting data, such as grooves or pits for tracking, addresses for control of data recording and synchronizing signals, are preliminarily formed on a substrate for writing information (Hereinafter, these formatting data are inclusively referred to as "pre-format"). A system has been known wherein such pre-format is given by an unevenness pattern having such a depth or height as to provide reflected light therefrom with a phase difference of $\lambda_0/4$. For example, for CDs, record pits corresponding to information are pattern-transferred by injection molding using a stamper having an unevenness pattern having a height of $\lambda_0/4$ and then the substrate is coated with a reflecting metal film of, e.g., aluminum or gold, showing a uniform reflectivity so as to allow reproduction of signals.

Further, in case of recording media of the additional writing-type, it is necessary to effect a control for writing additional information exactly on a recording track by continuously holding an illumination position with recording light exactly on the recording track with respect to the scanning direction and the direction transverse thereto. This control may be referred to as AT (auto-tracking). For this purpose, a tracking track or servo track, such as a tracking groove, bank or pit, is generally formed in advance on the substrate, and information is recorded and reproduced while effecting AT control by detecting a tracking signal depending on the servo track. A mode of detecting such a tracking signal from a conventional optical recording medium will now be explained hereinbelow.

FIG. 5 is a schematic sectional view of a conventional optical recording medium including a guide or servo track. The recording medium comprises an optically transparent substrate 2 of plastics, etc., a recording layer or light-reflecting layer 3 of, e.g., tellurium oxide, and a protective member 5. The substrate 2 is preliminarily provided with a servo track 7 having an unevenness pattern by known shaping process, and the recording layer 3 is formed in a uniform thickness over the servo track 7 by vacuum evaporation, etc.

Light or radiation used for information recording or reproduction or AT control is incident to the medium from the direction indicated by an arrow A. As is well known, in order to obtain a good AT control signal, it is necessary to accurately control the height (or depth) of the servo track 7. FIG. 6 is a graph showing a relationship between the track height and the intensity of reflected light reaching an AT control signal-detection system. In case of signal detection by utilizing interference between reflected light from another portion, the detected signal becomes a maximum when the track height is an odd number-times $\lambda/4n$ and becomes a minimum when the track height is an even number-times $\lambda/4n$ (wherein $\lambda$ is the wavelength of the light and $n$ is the refractive index of the substrate). This is quite the same as in the case of CD described above.

Incidentally, U.S. Pat. No. 4,230,915 to Dil, et al, discloses a record carrier in which the angle of inclination between the walls of the information areas and a normal to the record carrier has one value between the 30 and 65 degrees, and the geometric distance between the first plane providing the information areas and the second plane providing the intermediate areas has one value between 165/N and 270/N nanometers, N being the refractive index of a transparent medium which is disposed between the first and the second plane on the optically readable side of the information structure. More specifically, it is disclosed that it is difficult to form pits or hills having vertical walls through development and, when pits or hills are set to have inclined walls for easy production of a master through development, good signals can be attained if the depth of concavities or the height of connections is set to a value in the range of 165/N–270/N.

On the other hand, it is also reported that the angle between the wall of a track groove and the flat plane of an optical disk is allowed to have a large tolerance and little affects the signals.

As described above, various studies have been made on the sectional shape of pre-format on an optical recording medium and its effect on the signals. These studies, however, have been directed to optical recording media which comprise a vacuum evaporation deposition layer of a reflecting substance, such as silver, gold, aluminum and titanium, and the signal detection from the media is generally effected by using a phase difference of reflected light.

On the other hand, in the case of an optical recording medium having a reflecting layer formed by application or coating, a substrate prepared so as to obtain a pre-format signal based on a phase difference of reflected light is accompanied with difficulties as described below.

FIG. 3 is a schematic partial sectional view of an optical recording medium 1 including a section traversing a servo track formed as a concave groove on an optically transparent substrate, on which a solution containing a light-reflecting pigment or dye is applied and then dried to form a recording layer. Referring to the figure, the medium 1 comprises a transparent substrate 2 of plastic, etc., a light-reflecting recording layer 3 providing a servo track 11 and a recording track 12, an adhesive layer 4, and a protective member 5 of a transparent or opaque material of plastic, etc. By using the recording medium, information is recorded or reproduced by scanning and illuminating the recording track 12 with a laser beam while effecting AT control of the laser head depending on the signal from the servo track 11. In this instance, the laser beam used for recording and reproduction of information is incident from the direction indicated by an arrow A.

Incidentally, in the process of preparation of such an optical recording medium of the application type, when the light reflecting layer 3 is formed by solution application on the transparent substrate 2 having a concave servo track 11, the solution is liable to be accumulated at the concavity so that the light reflecting layer 3 inevitably has a thickness $d_1$ at the servo track 11 which is larger than a thickness $d_2$ at the recording track 11 ($d_2 < d_1$), as shown in FIG. 3.

Further, in the case of a light-reflecting layer comprising a dye or pigment, the reflectivity varies depending on the thickness in the range of 100 Å to several thousands of angstroms, so that a pre-format having a conventionally accepted depth of $\lambda_0/4$ did not provide a maximum signal intensity.

More specifically, the reflectivity of a dye or pigment layer varies depending on the thickness, for example, as shown in FIG. 4A. Incidentally, such a change in reflectivity (R) of a dye (or colorant) recording layer depending on the thickness can be calculated by the following equation (1):

$$\text{Reflectivity } R = \left| \frac{r_1 + r_0 \cdot \exp(i\delta)}{1 - r_0 r_1' \cdot \exp(i\delta)} \right| \quad (1)$$

wherein $r_0 = (n^* - n_a)/(n^* + n_a)$,
$r_1 = (n_s - n^*)/(n_s + n^*)$,
$r_1' = (n^* - n_s)/(n^* + n_s)$,
$\delta = 4\pi d n^*/\lambda$, and the respective symbols denote the following:

$n_s$: refractive index of the substrate, $n_a$: refractive index of the adhesive layer, $n^*$: complex index of refraction (in consideration of absorbance), d: thickness of the dye layer, and $\lambda$: wavelength of light used for recording or reproduction. Further, an equation of $n^* = n - ki$ exists, wherein n denotes the refractive index and k denotes the extinction coefficient of the dye layer.

FIG. 4A represents the reflectivity characteristic of a dye having the following formula and the calculated results based on the above equation (1) using the values of $n_s = 1.49$, $n_a = 1.49$, $n = 2.1$, $k = 1.0$, accordingly $n^* = 2.1 - 1.0i$ ($i = \sqrt{-1}$), and $\lambda = 830$ nm.

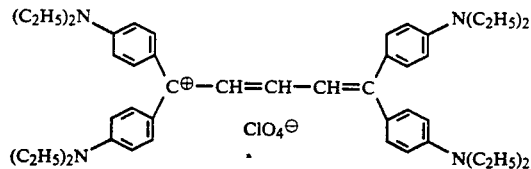

As is shown in FIG. 4A, the reflectivity of the dye sharply rises up to a thickness of 800–1000 Å to show a maximum and then shows a substantially constant value at a thickness not less than 2000 Å. Thus, the reflectivity changes depending on the thickness and the degree of the change is remarkable in the neighborhood of the maximum around 800–1000 Å.

Accordingly, when a transparent substrate having a concave servo track is coated with a light-reflecting substance by application, the signal therefrom is not only given by a phase difference but also superposed with an effect of a change in reflectivity (amplitude). This is considered to be why a concave servo track with a height of an odd number-times $\lambda/4n$ does not provide a tracking signal with a high contrast.

As a solution to such a problem, Japanese Laid-Open Patent Application (JP-A, Kokai) No. 239947/1985 discloses an information recording medium wherein a substrate is coated with a film of a light-absorptive and reflecting coloring matter of which the thickness is set to provide a maximum reflectivity, thus minimizing the reflectivity difference between the concavity and the convexity of the pre-format and obviating superposition of a reflectivity change on the effect of phase difference between the concavity and the convexity to thereby provide a stable pre-format signal. However, this technology is applicable to only a specific coloring matter showing a maximum reflectivity over a wide thickness range.

In order to solve the above problem, our research group has already proposed an optical recording medium wherein a concave servo track (track groove) is formed on a substrate and the size of the concavity is defined so as to provide a recording layer giving a maximum difference in reflectivity between the concavity and the other portions, thus providing a good pre-format signal (now U.S. Pat. No. 4,972,402).

The recording medium utilizes the fact that the reflectivity from the concavity and that from the other portion are determined by the thicknesses of the reflecting layer at those parts. For example, in the case of the above-mentioned coloring matter, referring to FIG. 3, the reflectivity at the recording track 12 is desirably as high as possible so as to provide a signal with a good S/N ratio, and therefor the thickness $d_2$ at the recording track is suitably on the order of 800–1100 Å. On the other hand, the servo track 11 is desired to show a reflectivity which provides a maximum difference from the reflectivity at the recording track so as to provide an AT control signal with as large an amplitude as possible, so that the thickness $d_1$ thereat is desirably set to about 1500–2000 Å from FIG. 4A. Further, even over 2000 Å, the reflectivity change does not exceed over about 10%, so that it is possible to set an arbitrary thickness not less than 2000 Å.

Incidentally, the reflecting layer thickness $d_1$ at the concave servo track is governed by the amount of the coating liquid (dye solution or pigment dispersion) accumulated at the concavity during the application step. Accordingly, the thickness $d_1$ at the servo track 11 can be controlled by changing the depth d and width 1 of the concave servo track to change the amount of the liquid accumulated in the concavity. In order to provide a recording track thickness $d_2$ of 900 –1100 Å and a servo track thickness $d_1$ of 1500–2000 Å as described hereinbefore, the depth d at the servo track is required to be about 1800-2000 Å or larger, which is larger than the depth of 1400 Å set to provide a desirable pre-format signal in respect of phase difference as described above.

In this way, in preparing a recording layer by application on a substrate having a concave servo track, the depth of the concavity is set not to conventional value of $\lambda/4n$ ($\lambda$: wavelength of light, n: refractive index of the substrate) but to a larger value taking accumulation of the coating liquid into consideration. Thus, it has become possible to obtain a pre-format signal with an improved contrast, but a recording medium giving a still further improved pre-format signal is desired.

SUMMARY OF THE INVENTION

In view of the above problems, an object of the present invention is to provide an information recording medium capable of providing a better pre-format signal than before, by taking into consideration the accumulation of a coating liquid at the concavity of the pre-format to cause a failure in providing a uniform thickness when a light-reflecting layer is formed by application of the coating liquid on a transparent substrate having the pre-format pattern.

A further object of the present invention is to provide an information recording medium capable of producing a better and more uniform pre-format signal.

A still further object of the present invention is to provide an information recording and/or reproduction method using such an information recording medium.

According to the present invention, there is provided an information recording medium to be illuminated with an optical radiation beam, comprising: a substrate having a surface provided with a pre-format pattern comprising a concavity and a convexity, and a light-reflecting layer formed by application of a coating liquid over the pre-format pattern; wherein the concavity has a sectional shape of a trapezoid having a pair of parallel opposite sides and a pair of sloping sides constituting walls of the concavity, one of the parallel sides constituting the bottom of the concavity being shorter than the opposite side, each of the sloping sides forming an angle $\theta$ of not larger than 35 degrees with respect to the extension of the surface, the concavity having a depth d larger than $\lambda/4n$, wherein $\lambda$ denotes the wavelength of the optical radiation beam and n denotes the refractive index of the substrate.

More specifically, in an information recording medium wherein a light-reflecting layer is formed by application of a coating liquid on a substrate having an unevenness pre-format pattern (e.g. B as shown in FIG. 3) and the pre-format signal may be attained as a combination of a difference in reflectivity due to a difference in reflecting layer thickness between the concavity and convexity and a phase difference due to the unevenness, I have found that the shape and thickness of the light-reflecting layer in the neighborhood of the edge of the concavity of the pre-format pattern greatly affects the production of a pre-format signal with a high contrast.

As a result of further investigation, I have succeeded in providing a pre-format signal with a higher contrast by forming the pre-format concavity in the shape of an open trapezoid having a depth larger than $\lambda/4n$ and setting the side slope so as to form an angle (solid part angle) $\theta$ with the substrate extension of 35 degrees or less. The reason for this improvement is not necessarily clear, but a gentle concavity of the light-reflecting layer formed by application and a side slope at an angle of 35 degrees or less of the pre-format concavity are considered to synergistically contributes to production of such a pre-format signal with a high contrast. Further, the production of a uniform pre-format signal may be attributable to the formation of the light-reflecting layer continuously over the recording track 11 and the servo track 12 as shown in FIG. 2 through application and drying of a coating liquid. Further, the trapezoidal concavity is considered to advantageously affect a very uniform accumulation of the coating liquid at the concavity, which leads to production of a stable and uniform pre-format signal.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic sectional views of an embodiment of the information recording medium according to the present invention.

DETAILED DESCRIPTION OF THE INVENTION

Figure 3:
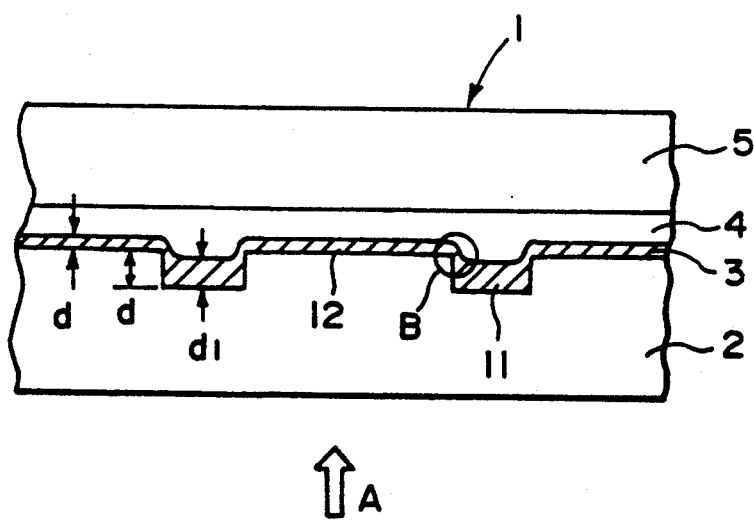
FIG. 3 is a schematic sectional view of an information recording medium of the prior art.

FIG. 1 is a schematic sectional view of an optical recording medium 1 according to the present invention, and FIG. 2 is a somewhat enlarge view thereof with denotation of some parts. Referring to FIG. 1, the optical recording medium 1 comprises a transparent substrate 2 having a surface provided with an uneven pre-format pattern including a servo track or guide track 7 in the form of a groove in this embodiment. The surface of the transparent substrate 2 having the pre-format pattern is coated with a light-reflecting layer 3 formed by application of a coating liquid. The reflecting layer 3 is further covered with a protective member 5 applied with an adhesive layer 4.

FIG. 2 is an enlarged view of the section of the optical recording medium shown in FIG. 1. Referring to FIG. 2, the pre-format pattern includes a recording track 11 where information is recorded and a servo track 12 in the form of a groove (concavity) in this embodiment formed on the substrate 2.

The concave servo track according to the present invention has a sectional shape of a trapezoid including a pair of parallel sides, a shorter one of which constitutes the bottom of the concavity. More specifically, the trapezoid is defined by its sloping side (constituting a wall of the concavity) forming an angle (solid part angle) $\theta$ with the extension of the substrate, a height, that is a depth (d) of the concavity and a width (l) of the concavity (between upper edges or a longer parallel side of the trapezoid).

In the present invention, the angle ($\theta$) is set to be 35 degrees or less and the depth (d) of the concavity is set to be larger than $\lambda/4n$ which is a depth ordinarily providing a maximum phase difference of reflected light. The depth (d) of the concavity may preferably be set to about 1.07–2.7 times, further preferably about 1.4–2.2 times, the value of $\lambda/4n$. More specifically, for example, the depth d of the pre-format concavity is desirably set to be larger than about 1400 Å in case where a beam with $\lambda=830$ nm is used in combination with a polymethyl methacrylate substrate with $n=1.49$ and set to be larger than about 1320 Å in case where a beam with $\lambda=830$ nm is used together with a polycarbonate substrate with $n=1.58$. As a result, a light-reflecting layer having a thickness showing substantially the minimum reflectivity at the concavity is formed.

Figure 7:
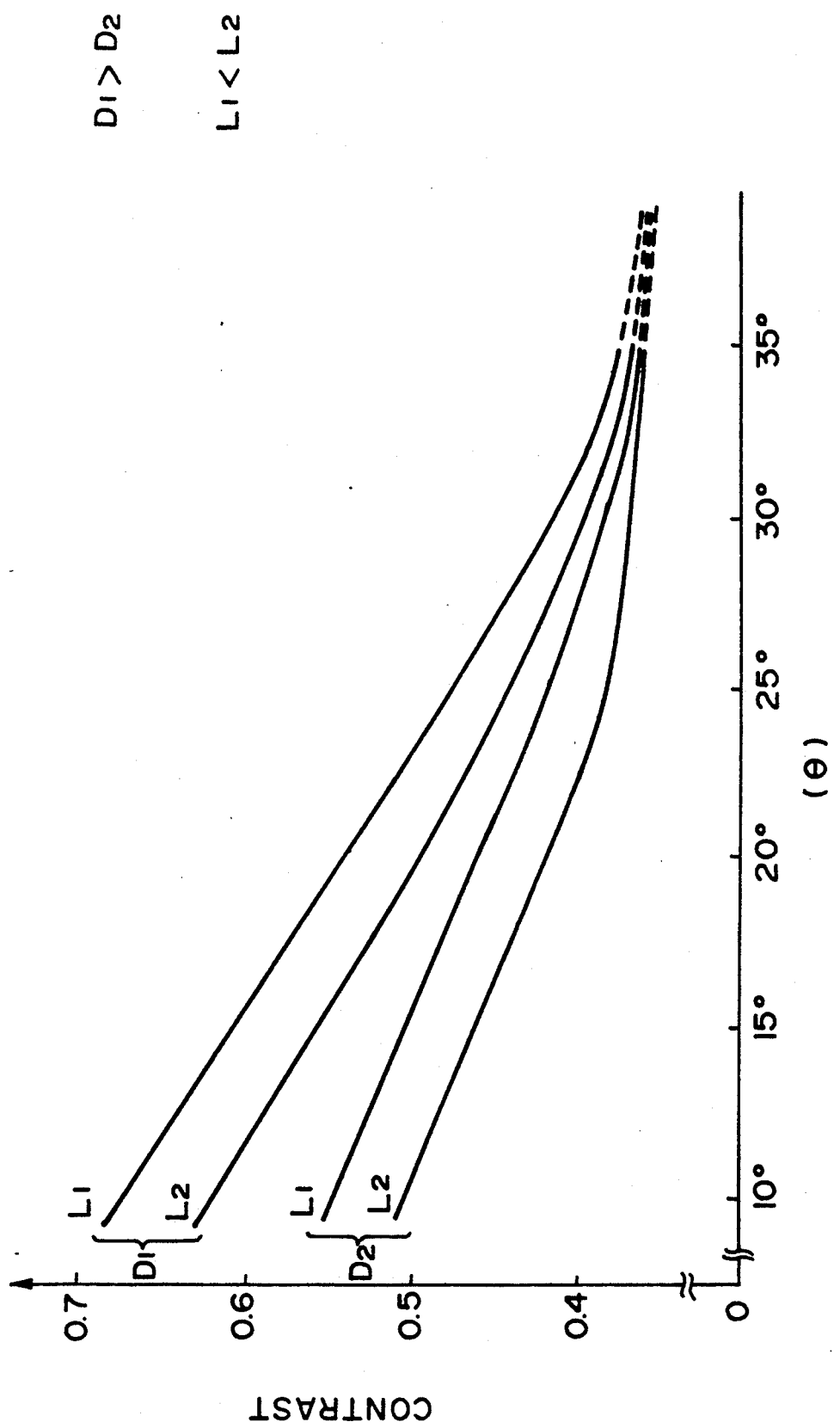
FIG. 7 is a graph generally showing a correlation between the contrast of a pre-format signal and the angle ($\theta$), depth (d) and width (1) of a concavity of an uneven pre-format pattern.

In this connection, these dimensions including the angle ($\theta$), depth (d) and width (l) show a certain correlation with the contrast of a pre-format signal. This is illustrated in FIG. 7. Referring to FIG. 7, the ordinate represents the contrast given by a track traversing signal and the abscissa represents the angle ($\theta$) with the depth (d) and width (l) as parameters. More specifically, the contrast is calculated as: (maximum intensity of reflected light minimum intensity of reflected light)/(maximum intensity of reflected light) based on values obtained by scanning a pre-format pattern with a laser beam so as to traverse the recording and servo tracks and measuring the maximum and minimum intensities (light quantities) of reflected light by means of an oscilloscope. In FIG. 7, parameters $D_1$ and $D_2$ denote values of the depth (d) of concavities having a relationship of $D_1 > D_2$, and parameters $L_1$ and $L_2$ denote values of the width (l) of concavities having a relationship of $L_1 < L_2$.

As shown in FIG. 7, a larger depth (d) provides a larger contrast. On the other hand, at a constant angle ($\theta$), a smaller depth (d) provides a smaller slope of a contrast-$\theta$ curve, so that a larger latitude is given for the angle $\theta$ in respect of providing as uniform a tracking signal as possible.

As a specific example, in order to provide a contrast in the range of 0.4–0.45 at $l = L_2$, the angle $\theta$ can assume a range of about 28–32 degrees for $d = D_1$, whereas the angle $\theta$ is allowed to have a wider range of about 21–28 degrees for $d = D_2$. A larger tolerance in angle $\theta$ is desired in view of the precision of formation of pre-format slope pattern. In view of this point and also a high contrast in combination, the depth (d) may preferably be in the range of 1500–3700 Å, further preferably 2000–3000 Å, most preferably 2500–3000 Å.

As for the angle ($\theta$), in the region of 35 degrees or below as shown in FIG. 7, a smaller angle ($\theta$) provides a larger contrast of track-traversing signal, but the formation of concavity slope can be stabilized at an angle $\theta$ of 15 degrees or larger. In view of this factor, the angle $\theta$ is preferably in the range of 15–35 degrees, more preferably 20–30 degrees.

The width (l) of the servo track depends on an optical system used in the recording and reproducing apparatus. More specifically, the width (l) desirably satisfies a relationship of $0.6 < 1/\phi < 1.5$ with respect to the spot size of an optical radiation beam, e.g., a semiconductor laser beam, used in the optical system. For example, the beam spot size ($\phi$) is about 1–2 microns for an optical disk and about 3 microns for an optical card. On the other hand, as shown in FIG. 7, a shorter track width (l) provides a higher contrast. Taking these factors into consideration, the width (l) is preferably 0.5–3 microns, further preferably 0.5–1.0 micron, particularly preferably 0.5–0.8 micron. Further, by using a small value of l, not only the contrast is increased as described above, but also the recording density is increased to enlarge the recording capacity. On the other hand, in case of an optical card which is liable to be contaminated and damaged, a larger spot size ($\phi$) is set so as to compensate for such factors. Thus, in case of a personal information recording medium, the width (l) is preferably set in the range of 1.5–4.5 microns, further preferably 1.8–3.5 microns, particularly preferably 2–3 microns.

Further, in this invention, the above factors are preferably set to keep a contrast of not lower than 0.36 so as to provide an improved tracking accuracy.

A substrate having such a pre-format pattern as described above is coated with a light-reflecting layer 3 by wet application. The reflecting layer 3 is formed continuously over the surface including the recording tracks 11, slopes (or concavity walls) and concavities 12 forming servo tracks as shown in FIG. 2.

The light-reflecting layer is required to show a prescribed reflectivity so as to allow a reliable reading of pre-format information formed on the substrate. The value thereof is determined in connection with a reproduction apparatus, but a reflectivity of at least 15% is desired at the recording track so as to effect a high accuracy of reproduction without being affected by contamination or damages on the substrate surface.

The material for the reflecting layer may be different depending on whether the information recording medium of the invention is constituted as one of the ROM-type for allowing only reading of information recorded as a pre-format pattern formed on the substrate or one of the additional writing-type for allowing such additional writing by using a servo track inclusive of address pits formed as a pre-format pattern on the substrate. In any case, however, the material is desirably one showing different reflectivities at different thicknesses. In the former ROM-type, a dispersion of metal fine powder in a binder or a heat-resistant dye or pigment (inclusively referred to as coloring matter) may suitably be used. In the latter type, a coloring matter showing both absorption and reflection to recording-reproduction light. Suitable examples thereof may include: dyes or pigments conventionally used as optical recording materials, inclusive of dyes or pigments of the cyanine type, squalium-type, phthalocyanine-type, tetrahydrocholine-type, polymethyine-type, and naphthoquinone-type, and organic complexes, such as benzenedithiol nickel complex.

Further, in the latter additional writing-type, it is possible to coat only a pre-format pattern with a light-reflecting layer by wet application and form a metal deposition layer to provide an additional writing region.

The organic solvent used in wet application of the light reflecting layer can be different depending on whether the coating liquid is in the form of a solution or a dispersion but may generally be selected from conventionally used solvents inclusive of alcohols, such as methanol, ethanol, isopropanol, and diacetone alcohol; ketones, such as acetone, methyl ethyl ketone and cyclohexanone; and further amides, ethers, esters, aliphatic halogenated hydrocarbons, aromatic hydrocarbons, and aliphatic hydrocarbons.

Then, referring again to FIG. 2, the reflecting layer at the recording track 11 of the information recording medium according to the present invention is preferably formed by application to provide a thickness showing substantially the highest reflectivity of the reflecting layer so as to attain a good pre-format signal with a high contrast. The thickness $d_2$ is determined by the optical constants including n (refractive index) and k (extinction coefficieint) of the reflecting layer (or recording layer) and is generally in the range of 400-1500 Å in case of dyes or pigments. On the other hand, the thickness $d_1$ at the pre-format concavity is preferably set to a value providing substantially the lowest reflectivity of the reflecting layer and is generally set to 1200 Å or thicker, further preferably 1500-3000 Å. In the present invention, the pre-format concavity is formed to have a depth d larger than $\lambda/4n$ and the thickness $d_2$ is set within the above range, whereby the thickness $d_1$ is caused to be not less than 1200 Å.

Figure 4A:
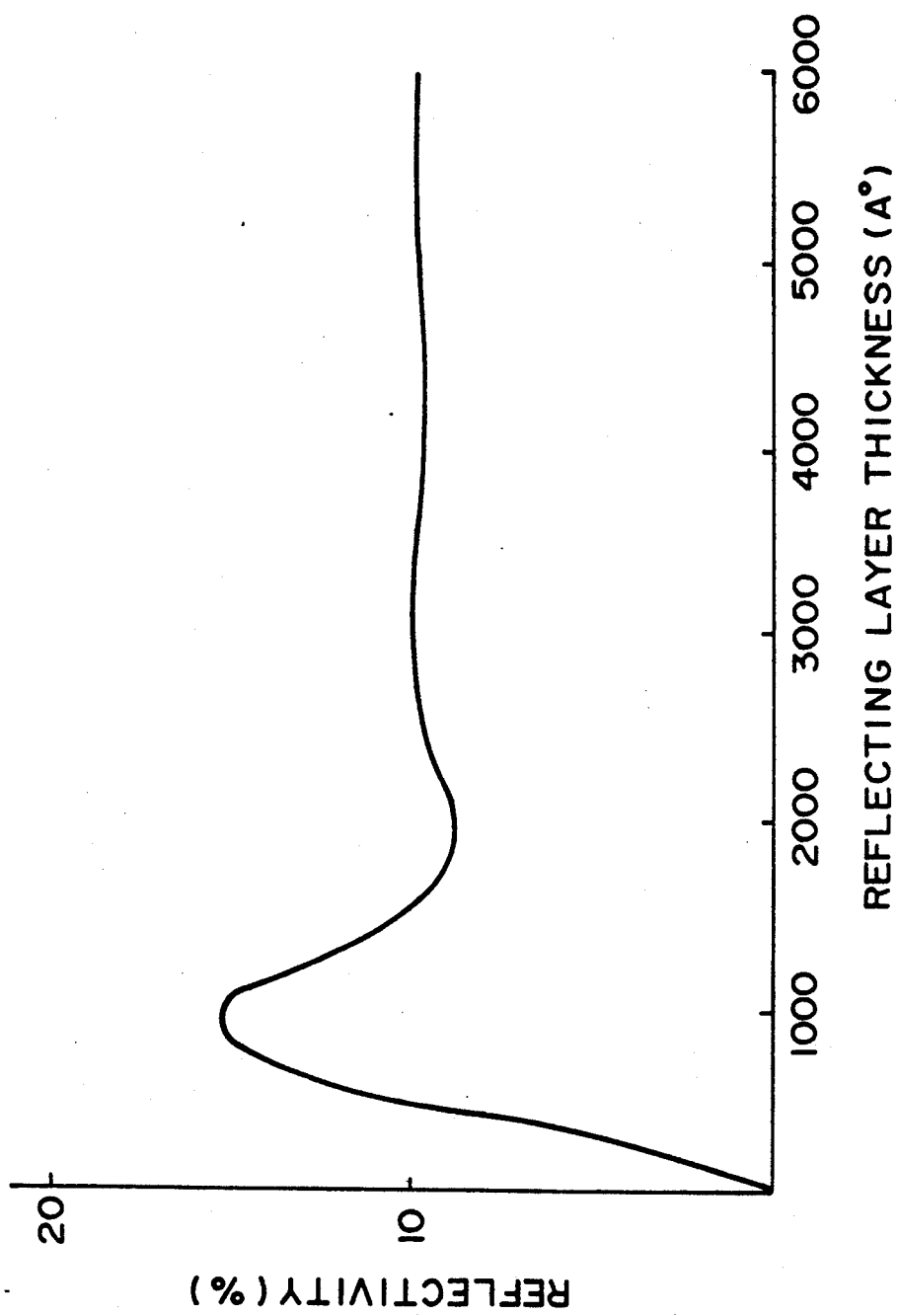
FIGS. 4A and 4B are graphs each showing a relationship between the thickness and reflecting a light-reflecting layer comprising an organic coloring matter.

A specific thickness may be determined based on the optical constants n and k inherent to a material constituting the light-reflecting layer. For example, in the case of the above-mentioned polymethine-type dye of the following structural formula [I] having n=2.1 and k=1.0, the reflectivity of its film varies depending on the thickness as shown in FIG. 4A.

Structural formula [I]

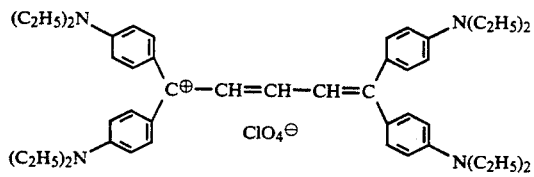

Accordingly, when the material is used, the recording track is preferably formed at a thickness $d_2$ of $900 \pm 100$ Å, and a signal with a contrast is expected to be given when the reflecting layer at the concave servo track is formed at a thickness $d_1$ of 1800-2000 Å providing a minimum reflectivity. The value $d_1 = 1800-2000$ Å is ensured by setting the depth d at the concave servo track to 2000-3000 Å, preferably 2300-2700 Å, particularly preferably 2500-2700 Å. The difference between $d_1$ and $d_2$ may vary depending on a particularly material constituting the reflecting layer. For the above dye $d_1$ may preferably be $d_2+300$ Å or more, further preferably $d_2+800$ Å or more.

In the present invention, in addition to the above, the sectional shape of the pre-format concavity (servo track in the above embodiment but can constitute a recording track) is designed to have a trapezoid with its shorter one of parallel sides constituting the bottom of the concavity and with its sloping side forming an angle $\theta$ of 35 degrees or smaller, preferably 20-30 degrees, with respect to the extension of the information recording medium, whereby a particularly good pre-format signal has been attained.

Incidentally, such a transparent substrate having a prescribed unevenness pre-format pattern may be prepared by injection, compression, casting or so-called 2P process by using a mold having a prescribed pattern.

The transparent substrate is required to show a high transmittance for an optical radiation beam used for recording and/or reproduction and may, for example, be formed from glass, ceramic, acrylic resin, vinyl chloride resin, polystyrene resin, or polycarbonate resin.

Further, in order to form a light-reflecting layer on a substrate having an uneven pre-format pattern on its surface, a solution or liquid dispersion of the above-mentioned material of the light-reflecting layer is applied by a method, such as roller coating, wire bar coating, air knife coating, calender coating, dip coating, or spray coating.

The solvent and solubility for preparing the coating liquid are determined by a particularly coloring matter used, and the solid content and viscosity of the coating liquid are determined based thereon so as to provide a thickness giving the maximum reflectivity.

For example, when a dye of, e.g., the structural formula (I) or (II) described herein is dissolved in diacetone alcohol, the dye may preferably be dissolved at a concentration of 1-5 wt. %, particularly 2-4 wt. %, so as to provide a viscosity of 2-20 cps, particularly 2-8 cps.

In drying the coating liquid to form the reflecting film, it is preferred that the leveling of the coating liquid is controlled while the solvent is evaporated to form a uniform coating film at the pre-format concavity. More specifically, it is for example preferred to gently blow clean air at room temperature onto the coating liquid on the substrate for drying. In this case, the velocity of the clean air may preferably be 1-5 m/min., particularly 2.5-3.5 m/min., and the drying time may preferably be 10 sec to 2 min, particularly 20-40 sec.

Then, the recording layer formed on the substrate is laminated with a protective member 5 by means of an adhesive layer 4, as desired, depending on the mode of use thereof.

The adhesive layer 4 for the above purpose may comprise a known adhesive, examples of which may include: thermoplastic adhesives comprising homopolymers or copolymers of vinyl monomers, such as vinyl acetate, acrylate esters, vinyl chloride, ethylene, acrylic acid and acrylamides, polyamides, polyesters, and polyethers; thermosetting resins, such as amino resins (urea resin, melamine resin), phenolic resin, epoxy resin, urethane resin, and thermosetting vinyl resins; and rubber-type adhesives, such as natural rubber, nitrile rubber, chloroprene rubber, and silicone rubber. Hot melt-type adhesives are particularly preferred because they allow dry application, in view of mass and continuous production.

The protective member 5 is used to mechanically protect the recording layer 3 and may be composed of plastic, metal, ceramics, glass plate, paper or composite materials of these.

The protective member can be either transparent or opaque as far as the above protective function is satisfied. This is rather determined by a readout system of optical information. If the readout system is of the transmission-type, the protective member is required to be transparent and satisfy a requirement in respect of double refraction similarly as the substrate. Thus, the material therefor is naturally restricted. If the readout system is of the reflection-type, the protective member can be opaque and the material therefor may be selected from wide scope of materials.

The protective may be disposed in optically direct contact with the reflecting layer 3 or may be formed in a so-called air gap structure with an air layer therebetween.

As described above, according to the present invention, a substrate with a pre-format concavity pattern is coated with a light-reflecting layer formed by wet-application and the concavity is designed to have a trapezoidal section with its shorter one of parallel sides constituting the bottom of the concavity and with its sloping side forming an angle of 35 degrees or smaller with respect to the substrate, whereby an information recording medium capable of providing an excellent uniform pre-format signal with little fluctuation is formed. Further, according to the present invention, even in the case of a personal or handy information recording medium which is liable to be marred or contaminated, therefore requires a large beam spot size for avoiding a tracking error caused by such difficulties and correspondingly is formed with a larger servo track width, a pre-format signal with a high contrast can be attained. Accordingly, the present invention is particularly suitably applied to such a personal, handy or pocketsized information recording medium, e.g., in the form of a card.

Incidentally, the sectional shape of the pre-format pattern and the thickness of the reflecting layer referred to herein are based on values obtained by cutting once prepared optical cards in a direction traversing their servo tracks and observing the resultant sections through a SEM (scanning electron microscope) at a magnification of 3000. Further, the contrasts are based on values measured by an optical card recording and reproduction machine (mfd. by Canon K. K.).

Hereinbelow, the present invention will be described more specifically based on Examples.

EXAMPLE 1

A transparent substrate of a polymethyl methacrylate plate (n=1.49) in a size of 10 cm (length)×10 cm (width)×0.4 mm (thickness) was imprinted with an unevenness pre-format pattern by hot pressing. The pre-format pattern comprised 3 micronwide tracking grooves (servo tracks) for AT control formed at a pitch of 12 microns so as to provide 2560 each of recording tracks and servo tracks alternately.

Each tracking groove showed a width l=3 microns, a depth d=2500 Å and a groove angle $\theta$=25 degrees.

The transparent substrate imprinted with a pre-format pattern was coated with a solution of the polymethine type dye of the following structural formula (I):

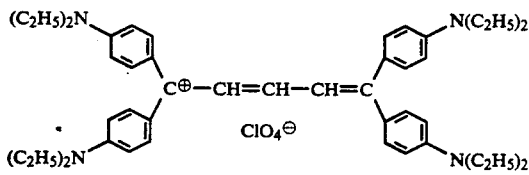

at a concentration of 3 wt. % in diacetone alcohol by means of a roller coater, followed by evaporation of the solvent diacetone alcohol to form a light-reflecting layer 3. The evaporation was performed by blowing clean air at 23° C. at a speed of 3 m/min for 20 seconds to the coated surface.

As described, the above dye has optical constants of n=2.1 and k=1.0 and shows a thickness-dependence of the reflectivity as shown in FIG. 4A. From the figure, the thickness $d_2$ at the recording region of the reflecting layer was set to 1000 Å (dry), and the tracking groove depth d was set to 2500 Å so as to provide a thickness $d_1$ at the tracking groove of 1800 Å. The thus-formed reflecting layer on the substrate was laminated with a 0.35 mm-thick logotype-printed acrylic resin plate (protective member) by the medium of a ethylene-vinyl acetate copolymer-based hot melt-type adhesive. The resultant laminate was finally cut into a card size of 86.0 mm×54.0 mm to form an optical card.

The optical card was subjected to measurement of a servo-track traversing signal as an AT control signal by using a reproduction optical system including an 830 nm-semiconductor laser. The laser beam was focused to a spot of 3 microns diameter and used for scanning across the recording track and servo track, whereby a contrast as defined hereinabove was measured for evaluation of the AT control signal.

EXAMPLES 2-4

Optical cards were prepared in the same manner as in Example 1 except that the groove angle $\theta$ was changed to 30, 15 and 12 degrees, respectively, and were evaluated with respect contrasts of servo-track traversing signals.

EXAMPLE 5

An optical card was prepared in the same manner as in Example 1 except that the tracking groove shape was changed to have a groove angle $\theta$ of 25 degrees and a depth d of 2000 Å and the thickness $d_2$ at the recording track (convexity) of the reflecting layer of the polymethine-type dye was set to 1000 Å. The resultant thickness $d_1$ of the reflecting layer at the concavity was 1600 Å.

The contrast of the track-traversing signal of the thus prepared optical card was measured in the same manner as in Example 1.

EXAMPLE 6

An optical card was prepared in the same manner as in Example 1 except that the tracking groove shape was changed to have a groove angle $\theta$ of 25 degrees and a depth d of 1500 Å and the thickness $d_2$ at the recording track (convexity) of the reflecting layer of the polymethine-type dye was set to 800 Å. The resultant thickness $d_1$ of the reflecting layer at the concavity was 1200 Å.

The contrast of the track-traversing signal of the thus prepared optical card was measured in the same manner as in Example 1.

COMPARATIVE EXAMPLE 1

The following four optical card samples were prepared in the same manner as in Example 1 except for the points noted specifically.

(1) An optical card prepared in the same manner as in Example 1 except that the groove angle $\theta$ was changed to 40 degrees. $d_2$=1000 Å, $d_1$=1800 Å.

(2) An optical card prepared in the same manner as in Example except that the tracking groove angle $\theta$ was changed to 90 degrees, and the depth d was changed to 1400 Å corresponding to $\lambda/4n$ for a phase difference-type. The resultant thickness $d_1$ at the concavity of the reflecting layer was 1000 Å, and $d_2$ was 800 Å.

(3) An optical card prepared in the same manner as in Example 1 except that the groove angle $\theta$ was changed to 2500 Å which was determined while taking accumulation of the coating liquid into consideration.

The resultant thickness $d_1$ at the concavity of the reflecting layer was 1000 Å, and $d_2$ was 1800 Å.

(4) An optical card prepared in the same manner as in Example 1 except that the groove angle $\theta$ was 25 degrees and the depth d was changed to 1400 Å corresponding to $\lambda/4n$ giving a maximum phase difference. The resultant thickness $d_1$ at the concavity of the reflecting layer was 1000 Å, and $d_2$ was 800 Å.

The contrasts of the above-prepared optical cards were measured similarly.

The results of the above Examples and Comparative Example 1 are listed in the following Table 1 with their minimum and maximum contrast value.

TABLE 1

| | Depth (d) (Å) | Angle ($\theta$) (degree) | Contrast |
|---|---|---|---|
| Example | | | |
| 1 | 2500 | 25 | 0.38–0.42 |
| 2 | 2500 | 30 | 0.39–0.42 |
| 3 | 2500 | 15 | 0.43–0.45 |
| 4 | 2500 | 12 | 0.42–0.47 |
| 5 | 2000 | 25 | 0.36–0.40 |
| 6 | 1500 | 25 | 0.30–0.33 |
| Comparative Example 1 | | | |
| (1) | 2500 | 40 | 0.22–0.29 |
| (2) | 1400 | 90 | –0.20 |
| (3) | 2500 | 90 | 0.23–0.32 |
| (4) | 1400 | 25 | 0.25–0.31 |

The contrast data "$-0.20$" means that the minimum contrast could not be measured.

EXAMPLE 7

A dye of the following structural formula (II) was used as a material for the light-reflecting layer.

Structural formula (II)

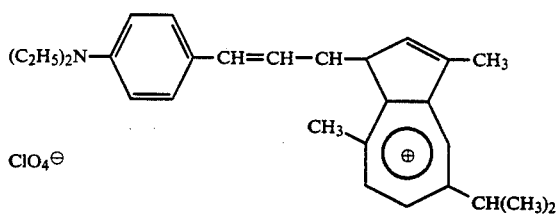

Figure 4B:
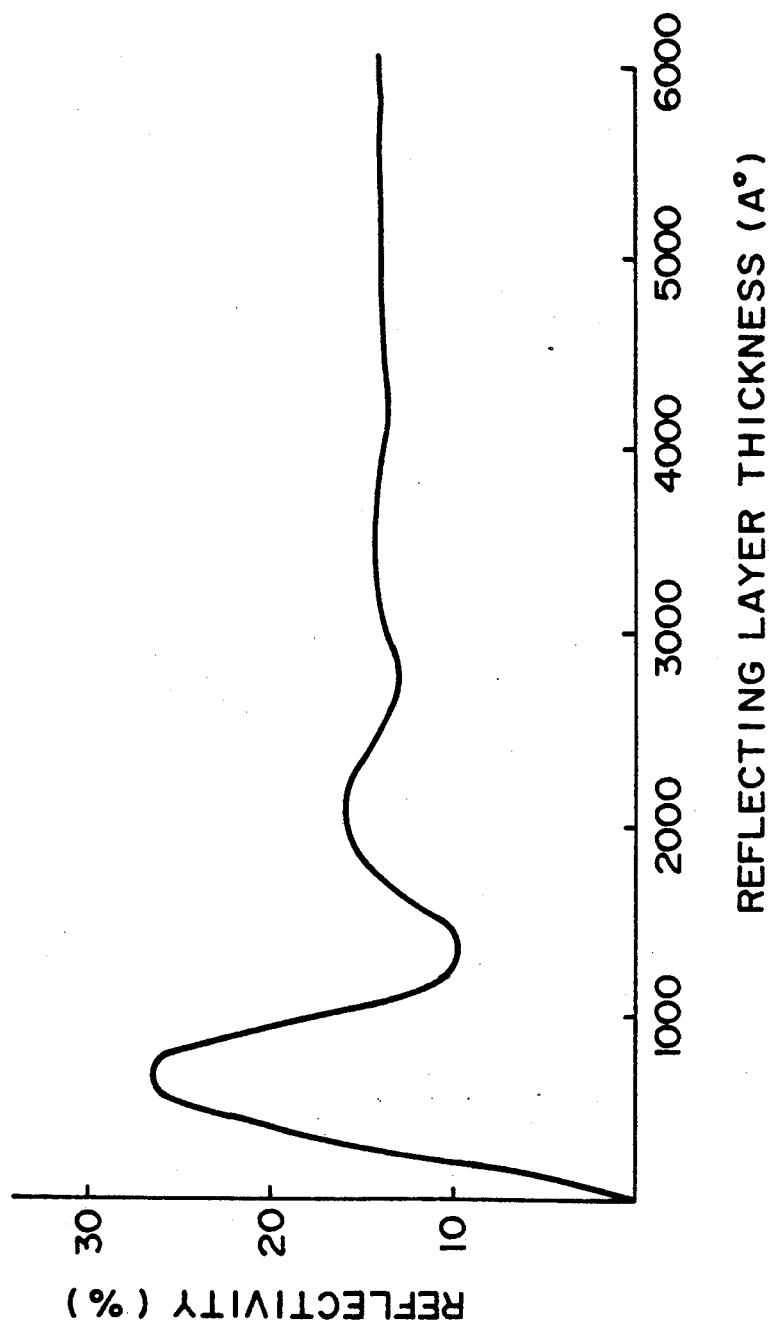
Figure 5:
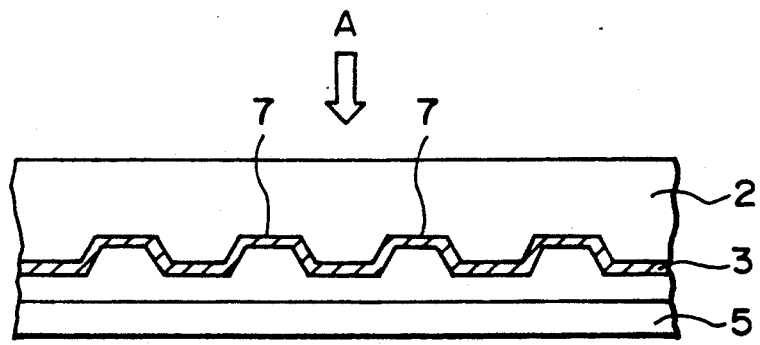
FIG. 5 is a schematic sectional view of a conventional optical recording medium.
Figure 6:
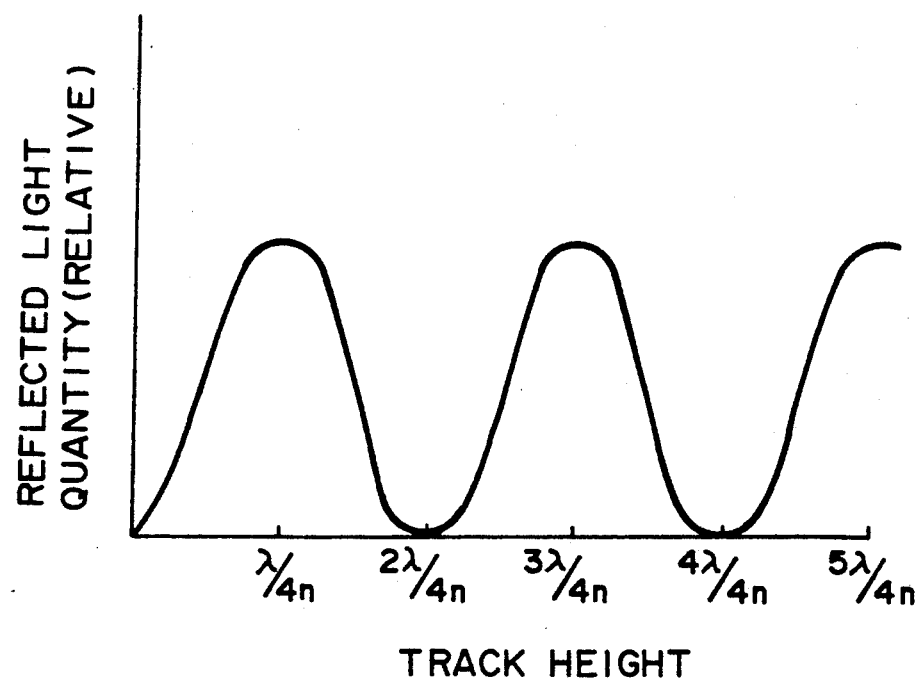
FIG. 6 is a graph showing a relationship between the height of a servo-track and the intensity of reflected light reaching an AT control signal detection system.

The dye has a refractive index n of 3.0, and an extinction coefficient k of 0.8. FIG. 4B shows the thickness-dependence of the above dye based on calculation by using the equation (1) described hereinbefore and the above optical constants. The graph shown in FIG. 4B indicates that the above dye layer shows the largest reflectivity at a thickness of 600–700 Å the smallest reflectivity of 10% around a thickness of 1300–1400 Å, and a substantially constant reflectivity of 14% at a thickness of 3000 Å or larger.

Accordingly, the dye solution was applied so as to provide a dry thickness $d_2$ of 600 Å at the recording track of the reflecting layer on a substrate having a pre-format pattern identical to that used in Example 1 except that the groove was shaped in a thickness d of 3000 Å and an angle $\theta$ of 25 degrees so as to provide a thickness $d_1$ at the groove of 1300 Å. The coating layer was dried by blowing clean air at 23° C. at a speed of 3.5 m/min for 30 sec. An optical card was prepared otherwise in the same manner as in Example 1.

The optical card was subjected to measurement of the contrast of the track traversing signal.

EXAMPLES 8–10

Optical cards were prepared in the same manner as in Example 7 except that the groove angle $\theta$ was changed to 30, 15 and 11 degrees, respectively, and were evaluated with respect contrasts of servo-track traversing signals.

EXAMPLE 11

An optical card was prepared in the same manner as in Example 7 except that the tracking groove shape was changed to have a groove angle $\theta$ of 25 degrees and a depth d of 2000 Å and the thickness $d_2$ at the recording track (convexity) of the reflecting layer of the polymethine-type dye was set to 600 Å. The resultant thickness $d_1$ of the reflecting layer at the concavity was 1200 Å.

The contrast of the track-traversing signal of the thus prepared optical card was measured in the same manner as in Example 1.

EXAMPLE 12

An optical card was prepared in the same manner as in Example 6 except that the tracking groove shape was changed to have a groove angle $\theta$ of 20 degrees and a depth d of 1500 Å and the thickness $d_2$ at the recording track (convexity) of the reflecting layer was set to 600 Å. The resultant thickness $d_1$ of the reflecting layer at the concavity was 1100 Å.

The contrast of the track-traversing signal of the thus prepared optical card was measured in the same manner as in Example 1.

COMPARATIVE EXAMPLE 2

The following four optical card samples were prepared in the same manner as in Example 7 except for the points noted specifically.

(1) An optical card prepared in the same manner as in Example 6 except that the groove angle $\theta$ was changed to 40 degrees $d_2=600$ Å, $d_1=1300$ Å.

(2) An optical card prepared in the same manner as in Example except that the tracking groove angle $\theta$ was changed to 90 degrees, and the depth d was changed to 1400 Å corresponding to $\lambda/4n$ for a phase difference-type. The resultant thickness $d_1$ at the concavity of the reflecting layer was 900 Å, and $d_2$ was 600 Å.

(3) An optical card prepared in the same manner as in Example 1 except that the groove angle $\theta$ was changed to 3000 Å which was determined while taking accumulation of the coating liquid into consideration.

The resultant thickness $d_1$ at the concavity of the reflecting layer was 1300 Å, and $d_2$ was 600 Å.

(4) An optical card prepared in the same manner as in Example 1 except that the groove angle $\theta$ was 20 degrees and the depth d was changed to 1400 Å corresponding to $\lambda/4n$ giving a maximum phase difference. The resultant thickness $d_1$ at the concavity of the reflecting layer was 900 Å, and $d_2$ was 600 Å.

The contrasts of the above-prepared optical cards were measured similarly.

The results of the above Examples 7–12 and Comparative Example 2 are listed in the following Table 2.

TABLE 2

| | Depth (d) (Å) | Angle (θ) (degree) | Contrast |
|---|---|---|---|
| Example | | | |
| 7 | 3000 | 25 | 0.41–0.45 |
| 8 | 3000 | 30 | 0.38–0.43 |
| 9 | 3000 | 15 | 0.43–0.47 |
| 10 | 3000 | 11 | 0.39–0.47 |
| 11 | 2000 | 25 | 0.36–0.40 |
| 12 | 1500 | 20 | 0.31–0.34 |
| Comparative Example 2 | | | |
| (1) | 3000 | 40 | 0.21–0.27 |
| (2) | 1400 | 90 | –0.17 |
| (3) | 3000 | 90 | 0.26–0.35 |
| (4) | 1400 | 20 | 0.28–0.32 |

As is understood from the above Tables 1 and 2, the information recording media according to Examples provided pre-format signals with a high contrast and little fluctuation, whereas Comparative Examples provided contrasts which were lower and with a large fluctuation.

What is claimed is:

1. An information recording medium to be illuminated with an optical radiation beam, comprising: a substrate having a surface provided with a pre-format pattern comprising a servo track and forming a sectional shape, in transverse to the servo track, which comprises a concavity disposed between two convexities, each having a flat top, and a light-reflecting layer formed by application of a coating liquid over the surface, wherein said light-reflecting layer has a different thickness at the concavity than at the convexities;

wherein the concavity has a sectional shape, in transverse to the servo track direction, of an open trapezoid having a pair of parallel opposite sides and a pair of sloping sides constituting walls of the concavity, one of the parallel sides constituting the bottom of the concavity being shorter than the opposite side, each of the sloping sides forming an angle θ that is greater than 0 but not larger than 35 degrees with respect to the extension of the surface, the concavity having a depth d larger than $\lambda/4n$, wherein λ denotes the wavelength of the optical radiation beam and n denotes the refractive index of the substrate.

2. A medium according to claim 1, wherein said light-reflecting layer comprises an organic coloring matter.

3. A medium according to claim 1, wherein the angle θ formed between the sloping side and the recording surface is in the range of 15 to 35 degrees.

4. A medium according to claim 2, wherein the organic coloring matter comprises a polymethine-type coloring matter.

5. A medium according to claim 1, wherein the angle θ between the sloping side and the recording surface is in the range of 20 to 30 degrees.

6. A medium according to claim 1, wherein said light-reflecting layer has a larger thickness at the concavity than at the convexities of the pre-format pattern.

7. A medium according to claim 6, wherein said light-reflecting layer has a thickness showing substantially the maximum reflectivity at the convexities and a thickness showing substantially the minimum reflectivity at the concavity of the pre-format pattern.

8. A medium according to claim 1, wherein the concavity of the pre-format pattern has a depth in the range of 1500–3700 Å.

9. A medium according to claim 1, wherein the concavity of the pre-format pattern has a depth in the range of 2000–3000 Å.

10. A medium according to claim 1, wherein the concavity of the pre-format pattern has a depth in the range of 2500–3000 Å.

11. An information recording-reproduction method, comprising illuminating an information recording medium with an optical radiation beam having a wavelength λ to effect recording or reproduction of information; said information recording medium comprising a substrate having a surface provided with a pre-format pattern comprising a servo track and forming a sectional shape, in transverse to the servo track, which comprises a concavity provided between two convexities, each having a flat top, and a light-reflecting layer formed by wet application of a coating liquid over the surface, wherein said light-reflecting layer has a different thickness at the concavity than at the convexities;

wherein the concavity has a sectional shape, in transverse to the servo track direction, of an open trapezoid having a pair of parallel opposite sides and a pair of sloping sides constituting walls of the concavity, one of the parallel sides constituting the bottom of the concavity being shorter than the opposite side, each of the sloping sides forming an angle θ that is greater than 0 but not larger than 35 degrees with respect to the extension of the surface, the concavity having a depth d larger than $\lambda/4n$, wherein λ denotes the wavelength of the optical radiation beam and n denotes the refractive index of the substrate.

12. A method according to claim 11, wherein the information medium being recorded on and having the angle θ formed between the sloping side and the substrate surface further limits the range of the angle θ from 15 to 35 degrees.

13. A method according to claim 11, wherein the information medium being recorded on and having the angle θ formed between the sloping side and the substrate surface further limits the range of the angle θ from 20 to 30 degrees.

14. A method according to claim 11, wherein said light-reflecting layer, of the information medium being recorded on, has a larger thickness at the concavity than at the convexity of the pre-format pattern.

15. A method according to claim 11, wherein said light-reflecting layer, of the information medium being recorded on, has a thickness showing substantially the maximum reflectivity at the convexity and a thickness showing substantially the minimum reflectivity at the convexity of the pre-format pattern.

16. A method according to claim 11, wherein the concavity of the pre-format pattern of the information medium being recorded on, has a depth in the range of 1500–3700 Å.

17. A method according to claim 11, wherein the concavity of the pre-format pattern, of the information medium being recorded on, has a depth in the range of 2000–3000 Å.

18. A method according to claim 11, wherein the concavity of the pre-format pattern, of the information medium being recorded on, has a depth in the range of 2500–3500 Å.

19. An information recording medium to be illuminated with an optical radiation beam, comprising: a substrate having a surface provided with tracking grooves, the tracking grooves being separated from each other by a recording track which forms a flat surface, and alight-reflecting layer formed by application of a coating liquid over the surface, wherein said light-reflecting layer has a different thickness at the tracking groove than at the recording track, wherein each tracking groove has a sectional shape in transverse to the tracking groove direction, of an open trapezoid having a pair of parallel opposite sides and a pair of sloping sides constituting walls of the groove, one of the parallel sides constituting the bottom of the groove being shorter than the opposite side, each of the sloping sides forming an angle $\theta$ of not larger than 35 degrees with respect to the extension of the surface, the groove having a depth d larger than $\lambda/4n$, wherein $\lambda$ denotes the wavelength of the optical radiation beam and n denotes the refractive index of the substrate.

20. A medium according to claim 19, wherein said light-reflecting layer comprises an organic coloring matter.

21. A medium according to claim 20, wherein the organic coloring matter comprises a polymethine-type coloring matter.

22. A medium according to claim 19, wherein the angle $\theta$ formed between the sloping side and the substrate surface is in the range of 15 to 35 degrees.

23. A medium according to claim 22, wherein the angle $\theta$ formed between the sloping side and the substrate surface is in the range of 20 to 30 degrees.

24. A medium according to claim 19, wherein said light-reflecting layer has a larger thickness at the tracking groove than at the recording track.

25. A medium according to claim 19, wherein said light-reflecting layer has a thickness showing substantially the maximum reflectivity at the recording track and a thickness showing substantially the minimum reflectivity at the tracking groove.

26. A medium according to claim 19, wherein the tracking groove has a depth in the range of 1500–3700 Å.

27. A medium according to claim 26, wherein the tracking groove has a depth in the range of 200–3000 Å.

28. A medium according to claim 27, wherein the tracking groove has a depth in the range of 2500–3000 Å.

29. An information recording-reproduction method, comprising illuminating an information recording medium with an optical radiation beam having a wavelength $\lambda$ to effect recording or reproduction of information; said information recording medium comprising a substrate having a surface provided with tracking grooves, the tracking grooves being separated from each other by a recording track which forms a flat surface, and alight-reflecting layer formed by wet application of a coating liquid over the surface, wherein said light-reflecting layer has different thicknesses at the tracking groove than at the recording track wherein each tracking groove has a sectional shape, in transverse to the tracking groove direction, of an open trapezoid having a pair of parallel opposite sides and a pair of sloping sides constituting walls of the groove, one of the parallel sides constituting the bottom of the groove being shorter than the opposite side, each of the sloping sides forming an angle $\theta$ of not larger than 35 degrees with respect to the extension of the surface, the groove having a depth d larger than $\lambda/4n$, wherein $\lambda$ denotes the wavelength of the optical radiation beam and n denotes the refractive index of the substrate.

30. A method according to claim 29, wherein the angle $\theta$ formed between the sloping side and the substrate surface is in the range of 15 to 35 degrees.

31. A method according to claim 30, wherein the angle $\theta$ formed between the sloping side and the substrate surface is in the range of 20 to 30 degrees.

32. A method according to claim 29, wherein said light-reflecting layer has a larger thickness at the tracking groove than at the recording track.

33. A method according to claim 29, wherein said light-reflecting layer has a thickness showing substantially the maximum reflectivity at the recording track and a thickness showing substantially the minimum reflectivity at the tracking groove.

34. A medium according to claim 29, wherein the tracking groove has a depth in the range of 1500–3700 Å.

35. A medium according to claim 34, wherein the tracking groove has a depth in the range of 2000–3000 Å.

36. A medium according to claim 35, wherein the tracking groove has a depth in the range of 2500–3500 Å.

* * * * *

UNITED STATES PATENT AND TRADEMARK OFFICE
CERTIFICATE OF CORRECTION

PATENT NO. : 5,216,665　　　　　　　　　　Page 1 of 3
DATED : June 1, 1993
INVENTOR(S): HIROYUKI IMATAKI It is certified that error appears in the above-indentified patent and that said Letters Patent is hereby corrected as shown below:

COLUMN 1:
　　line 34, "is" should read --to be--;
　　line 35, "C/N ratio" should read --S/N ratio--

COLUMN 2:
　　line 34, "odd number-times" should read --odd-number times--;
　　line 35, "even number-" should read --even-number--;
　　line 42, "the" (second occurrence) should be deleted; and
　　line 68, "and" should read --or--.

COLUMN 3:
　　line 59, "$n_1$refractive" should read --$n_1$:refractive--.

COLUMN 5:
　　line 4, "width 1" should read --width 1--.

COLUMN 6:
　　line 11, "contributes" should read --contribute--;
　　line 45, "width (1)" should read --width (1)--; and
　　line 52, "enlarge" should read --enlarged--.

COLUMN 7:
　　line 35, "light minimum" should read --light - minimum--; and
　　line 44, "width (1)" should read --width (1)--.

COLUMN 8:
　　line 53, "showing" should read --shows--;
　　line 59, "polymethyine-type," should read
　　　　　　　--polymethine-type,--.

UNITED STATES PATENT AND TRADEMARK OFFICE
CERTIFICATE OF CORRECTION

PATENT NO. : 5,216,665
DATED : June 1, 1993
INVENTOR(S): HIROYUKI IMATAKI

It is certified that error appears in the above-indentified patent and that said Letters Patent is hereby corrected as shown below:

COLUMN 9:
    line 11, "by application" should read --by wet application--.

COLUMN 11:
    line 3, "protective" should read --protective member--; and
    line 26, "etsized" should read --et-sized--.

COLUMN 12:
    line 10, "a" should read --an--;
    line 27, "respect" should read --respect to--; and
    line 64, "Example" should read --Example 1--.

COLUMN 14:
    line 11, "respect" should read --respect to--;
    line 45, "degrees" should read --degrees.--; and
    line 47, "Example" should read --Example 1--.

COLUMN 15:
    line 25, "comprising: a" should read
        --comprising:
          ¶   a--.

COLUMN 16:
    line 8, "comprising illuminating" should read
        --comprising:
          ¶   illuminating--;
    line 66, "comprising: a" should read
        --comprising:
          ¶   a--.

UNITED STATES PATENT AND TRADEMARK OFFICE
CERTIFICATE OF CORRECTION

PATENT NO. : 5,216,665
DATED : June 1, 1993
INVENTOR(S) : HIROYUKI IMATAKI

It is certified that error appears in the above-indentified patent and that said Letters Patent is hereby corrected as shown below:

COLUMN 17:

line 2, "alight-reflecting" should read --a light-reflecting--; and
line 41, "200-3000 Å." should read --2000-3000 Å.--.

COLUMN 18:

line 7, "alight-reflecting" should read --a light-reflecting--.

Signed and Sealed this

Twelfth Day of April, 1994

Attest:

BRUCE LEHMAN

Attesting Officer

Commissioner of Patents and Trademarks